(12) United States Patent
Ehrman et al.

(10) Patent No.: US 7,786,844 B2
(45) Date of Patent: Aug. 31, 2010

(54) MOBILE PORTAL FOR RFID APPLICATIONS (75) Inventors: Kenneth S. Ehrman, Upper Saddle River, NJ (US); Michael L. Ehrman, New York, NY (US); Jeffrey M. Jagid, Closter, NJ (US)

(73) Assignee: I.D. Systems, Inc., Hackensack, NJ (US)

( * ) Notice: Subject to any disclaimer, the term of this patent is extended or adjusted under 35 U.S.C. 154(b) by 0 days.

(21) Appl. No.: 11/276,469

(22) Filed: Mar. 1, 2006

(65) Prior Publication Data

US 2006/0208891 A1    Sep. 21, 2006

Related U.S. Application Data (60) Provisional application No. 60/657,655, filed on Mar. 1, 2005.

(51) Int. Cl.
H04Q 5/22 (2006.01)
(52) U.S. Cl. ............... 340/10.1; 340/568.1; 340/572.4; 340/825.72
(58) Field of Classification Search ............... 340/10.1, 340/3.51, 505, 825.28, 825.72, 825.69, 5.61, 340/5.64, 568.1, 572.4; 700/236, 225, 214, 700/213; 235/385
See application file for complete search history.

(56) References Cited

U.S. PATENT DOCUMENTS

| | | |
|---|---|---|
| 3,705,976 A | 12/1972 | Platzman |
| 4,303,904 A | 12/1981 | Chasek |
| 4,338,587 A | 7/1982 | Chiappetti |
| 4,398,172 A | 8/1983 | Carroll et al. |
| 4,438,491 A | 3/1984 | Constant |
| 4,549,264 A | 10/1985 | Carroll et al. |
| 4,603,390 A | 7/1986 | Mehdipour et al. |
| 4,656,463 A | 4/1987 | Anders et al. |

(Continued)

FOREIGN PATENT DOCUMENTS

EP    0851701    7/1998

(Continued)

OTHER PUBLICATIONS

International Search Report dated Oct. 18, 2005.

(Continued)

*Primary Examiner*—Vernal U Brown
(74) *Attorney, Agent, or Firm*—Troutman Sanders LLP; James E. Schutz (57) ABSTRACT

A mobile portal for RFID applications includes an RFID reader for reading identifications of proximately located RFID tagged items in the environment. A communicator is coupled to the RFID reader to receive the read identifications and then communicate the received read identifications over the wireless interface, through one of the gateways, to the central data processing system. Each mobile portal may be actuated for RFID read operations in response to information sensed concerning operation of the mobile asset/vehicle. Additionally, the central data processing system may issue instructions concerning mobile asset/vehicle operation, with those instructions communicated over the wireless interface to the mobile portal. Responsive to implementation of those instructions, the mobile portal actuates the RFID reader and compares the read identifications to identifications of certain RFID tagged items to be manipulated which were identified in the received instruction.

20 Claims, 2 Drawing Sheets

U.S. PATENT DOCUMENTS

| | | | |
|---|---|---|---|
| 4,688,026 | A | 8/1987 | Scribner et al. |
| 4,908,500 | A | 3/1990 | Baumberger |
| 4,918,425 | A | 4/1990 | Greenberg et al. |
| 4,937,581 | A | 6/1990 | Baldwin et al. |
| 4,979,170 | A | 12/1990 | Gilhousen et al. |
| 5,086,389 | A | 2/1992 | Hassett et al. |
| 5,089,974 | A | 2/1992 | Demeyer et al. |
| 5,101,200 | A | 3/1992 | Swett |
| 5,119,104 | A | 6/1992 | Heller |
| 5,151,684 | A | 9/1992 | Johnsen |
| 5,166,872 | A | 11/1992 | Weaver et al. |
| 5,192,954 | A | 3/1993 | Brockelsby et al. |
| 5,204,670 | A | 4/1993 | Stinton |
| 5,204,675 | A | 4/1993 | Sekine |
| 5,206,643 | A | 4/1993 | Eckelt |
| 5,218,344 | A | 6/1993 | Ricketts |
| 5,231,584 | A | 7/1993 | Nimura et al. |
| 5,253,162 | A | 10/1993 | Hassett |
| 5,257,393 | A | 10/1993 | Miller |
| 5,281,859 | A | 1/1994 | Crane |
| 5,287,353 | A | 2/1994 | Buda et al. |
| 5,289,369 | A | 2/1994 | Hirshberg |
| 5,295,244 | A | 3/1994 | Dev et al. |
| 5,303,343 | A | 4/1994 | Ohya et al. |
| 5,321,584 | A | 6/1994 | Matheny |
| 5,327,144 | A | 7/1994 | Stilp et al. |
| 5,347,274 | A | 9/1994 | Hassett |
| 5,396,215 | A | 3/1995 | Hinkle |
| 5,426,425 | A | 6/1995 | Conrad et al. |
| 5,514,967 | A | 5/1996 | Zelm |
| 5,682,142 | A | 10/1997 | Loosmore et al. |
| 5,691,980 | A | 11/1997 | Welles, II et al. |
| 5,715,905 | A | 2/1998 | Kaman |
| 5,794,174 | A | 8/1998 | Janky et al. |
| 5,822,309 | A | 10/1998 | Ayanoglu et al. |
| 5,886,634 | A * | 3/1999 | Muhme .................. 340/572.1 |
| 5,892,441 | A | 4/1999 | Woolley et al. |
| 6,006,148 | A | 12/1999 | Strong |
| 6,104,712 | A | 8/2000 | Robert et al. |
| 6,141,610 | A | 10/2000 | Rothert et al. |
| 6,150,921 | A | 11/2000 | Werb et al. |
| 6,240,365 | B1 | 5/2001 | Bunn |
| 6,330,499 | B1 | 12/2001 | Chou et al. |
| 6,430,488 | B1 | 8/2002 | Goldman et al. |
| 6,476,763 | B2 | 11/2002 | Allen, Jr. |
| 6,496,806 | B1 * | 12/2002 | Horwitz et al. ............... 705/28 |
| 6,505,106 | B1 | 1/2003 | Lawrence et al. |
| 6,507,786 | B2 | 1/2003 | Flick |
| 6,539,393 | B1 | 3/2003 | Kabala |
| 6,600,418 | B2 | 7/2003 | Francis et al. |
| 6,609,082 | B2 | 8/2003 | Wagner |
| 6,614,349 | B1 | 9/2003 | Proctor et al. |
| 6,710,738 | B2 | 3/2004 | Allen, Jr. |
| 6,898,493 | B2 | 5/2005 | Ehrman et al. |
| 6,924,748 | B2 | 8/2005 | Obradovich et al. |
| 6,941,202 | B2 | 9/2005 | Wilson et al. |
| 6,977,612 | B1 * | 12/2005 | Bennett .................. 342/357.07 |
| 7,030,760 | B1 * | 4/2006 | Brown ..................... 340/568.1 |
| 7,151,979 | B2 | 12/2006 | Andersen et al. |
| 2001/0005178 | A1 | 6/2001 | Stewart |
| 2002/0065698 | A1 | 5/2002 | Schick et al. |
| 2002/0184062 | A1 | 12/2002 | Diaz |
| 2003/0055666 | A1 | 3/2003 | Roddy et al. |
| 2003/0056113 | A1 | 3/2003 | Korosec |
| 2003/0074244 | A1 | 4/2003 | Braxton |
| 2003/0130913 | A1 | 7/2003 | Ehrman et al. |
| 2003/0171939 | A1 | 9/2003 | Yagesh et al. |
| 2003/0195825 | A1 | 10/2003 | Ehrman et al. |
| 2003/0216976 | A1 | 11/2003 | Ehrman et al. |
| 2003/0225707 | A1 | 12/2003 | Ehrman et al. |
| 2004/0015419 | A1 | 1/2004 | Ehrman et al. |
| 2004/0022227 | A1 | 2/2004 | Lynch et al. |
| 2004/0204867 | A1 | 10/2004 | Smith et al. |
| 2004/0254759 | A1 * | 12/2004 | Kubach et al. .............. 702/174 |
| 2005/0237184 | A1 | 10/2005 | Muirhead |
| 2005/0241548 | A1 | 11/2005 | Muirhead |

FOREIGN PATENT DOCUMENTS

| | | |
|---|---|---|
| EP | 1113628 | 7/2001 |
| JP | 406068104 A | 3/1994 |
| WO | WO01/05175 | 1/2001 |
| WO | WO2004/112403 | 12/2004 |

OTHER PUBLICATIONS

General Motors OnStar; Darden Graduate School of Business Administration; University of Virginia; 2000; pp. 1-11.

Vetronix Corporation; 15 Years of Excellence; On-Line Information; Apr. 10, 2000; pp. 1-7.

The OBO II Home Page; Jun. 15, 1999; pp. 1-4.

Int'l Search Report & Written Opinion for related PCT Application No. PCT/US2006/07142 dated Mar. 7, 2007.

International Search Report Dated Sep. 20, 2007.

* cited by examiner

MOBILE PORTAL FOR RFID APPLICATIONS

CROSS-REFERENCE TO RELATED APPLICATIONS

This application claims the benefit of U.S. Provisional Application No. 60/657,655, filed 1 Mar. 2005.

BACKGROUND OF THE INVENTION

1. Technical Field of the Invention

The present invention relates to the field of radio frequency identification (RFID) systems.

2. Description of Related Art

Conventional RFID technology is focused on techniques for scanning items (such as pallets, baggage, products, and the like) using either passive or active wireless interrogation at distances of between approximately 2-10 feet. Such a wireless interrogation process serves to replace the need of prior art bar code scanning systems that manually scan each individual item, with a more efficient process that allows for a one-time remote scan of all included items. RFID-based scanning thus reduces the labor associated with manually manipulating items in order to access a bar code label.

A typical RFID system installation places wireless interrogators at fixed locations known as "portals." As tagged items pass through (or just in proximity to) these fixed portals (for example, as carried by a person, vehicle or machine), the associated RFID tag for the item is wirelessly interrogated to obtain item identification information. This identification information is then associated with information relating to the identity and/or position of the fixed portal that made the read. The collected information is then reported to a central data processing system where the information can be viewed and stored for purposes of later query and manipulation.

The successful deployment of such RFID systems has heightened industry's awareness of the potential for a truly fully automated data tracking and monitoring system. With this emerging technology comes unique concepts for its use in productivity monitoring.

Therefore, it can be seen that a need yet exists for an enhanced RFID system that provides superior functionality and usefulness over conventional RFID-based systems. It is to such a mobile portal for RFID applications that the present invention is primarily directed.

BRIEF SUMMARY OF THE INVENTION

Briefly described, in its preferred form, the present invention is a mobile RFID portal that is associated with a mobile asset, such as vehicle. An RFID interrogator is positioned on the mobile asset and operates to wirelessly interrogate for proximately located RFID tags attached to items. A wireless radio frequency (RF) communications transmitter also positioned on the mobile asset is coupled to the RFID interrogator and functions to establish a data communications link with a central data processing system. The RFID interrogator captures "captured item identification information" from proximately located RFID tags (either passive or active tags), and the RF communications transmitter transmits the captured item identification information over the data communications link to the central data processing system.

As a further enhancement, the RF communications transmitter may further include functionality for determining information regarding the mobile asset, "mobile asset identification information", preferably being location information. The RF communications transmitter can then transmit both the captured item identification information and the mobile asset identification information over the data communications link to the central data processing system.

The captured item identification information and the mobile asset identification information may then be associated with each other by the central data processing system, thus allowing for the determination of not only what items were present, but also where those items were located when their RFID tags were read.

In one preferred embodiment, the mobile RFID portal of the present invention is associated with a mobile asset such as a forklift. As the operator of that mobile asset moves about an environment, such as a warehouse, moving items, the mobile RFID portal uses its wireless interrogator to identify items being handled by that mobile asset, and further uses its RF communications transmitter to transmit the captured item identification information, along with the mobile asset identification information, to the central data processing system over the data communications link.

In another preferred embodiment, the mobile RFID portal further determines the mobile asset location at each wireless interrogation, and includes the mobile asset identification information, being location information, along with the captured item identification information in the RF communication to the central data processing system. Advantageously, this allows for the monitoring of the mobile asset operator and asset location while efficiently, cost-effectively and reliably tracking the identification of items being moved. This concept essentially creates a "mobile" RFID portal operable to track tagged items, and the mobile assets that manipulate those items, in real-time throughout the supply chain.

In another preferred embodiment, the mobile RFID portal comprises an RFID reader mountable to a mobile asset/vehicle and a communicator associated with the RFID reader for actuating the RFID reader to read identifications of proximately located RFID tagged items when predetermined mobile asset/vehicle operational data is identified.

In yet another preferred embodiment of the present invention, a system is provided, and comprises a mobile RFID portal for attachment to a mobile asset/vehicle. The mobile RFID portal includes an RFID reader for reading identifications of proximately located RFID tagged items, and a communicator coupled to the RFID reader to receive the read identifications, and communicate the received read identifications over a wireless interface. A central data processing system is coupled to the wireless interface to receive the read identifications communicated from the communicator in the mobile RFID portal.

Another preferred embodiment of the present invention comprises a system provided with a mobile RFID portal for attachment to a mobile asset/vehicle. The mobile RFID portal includes an RFID reader for reading identifications of proximately located RFID tagged items, and a communicator coupled to the RFID reader to receive the read identifications, and communicate the received read identifications over a wireless interface. A gateway node is operable to wirelessly communicate with the communicator in the mobile RFID portal over the wireless interface and receive the communicated read identifications.

In another preferred embodiment of the present invention, a mobile RFID portal is provided, and comprises an RFID reader for mounting to a mobile asset/vehicle, and a communicator connected to the RFID reader. The communicator actuates the RFID reader to read identifications of proximately located RFID tagged items, receives the read identifications, and communicates the received read identifications over a wireless interface.

In accordance with yet another preferred embodiment, a system of the present invention comprises a central data processing system and a plurality of gateways each connected to the central data processing system and each supporting communications over a wireless interface. A plurality of mobile RFID portals are also included, with each mobile portal attached to a mobile asset/vehicle. Each mobile portal includes an RFID reader for reading identifications of proximately located RFID tagged items, and a communicator coupled to the RFID reader to receive the read identifications and communicate the received read identifications over the wireless interface, through one of the gateways, to the central data processing system.

In accordance with yet another preferred embodiment, a system for tracking RFID tagged items comprises a plurality of mobile RFID portals for attachment to a plurality of mobile asset/vehicles. Each mobile RFID portal includes an RFID reader for reading identifications of proximately located RFID tagged items, a data storage device for storing read identifications, and a communicator for transmitting read identifications over a wireless interface. The system may also include a central data processing system coupled to the wireless interface to receive the read identifications communicated from the communicators in the plurality of mobile RFID portals. Additionally, the central data processing system maintains records of the location of a plurality of RFID tagged items present in a predetermined geographic area and it receives data from each of the plurality of mobile RFID portals representative of the RFID tagged items moved by the mobile asset/vehicle associated with the respective mobile RFID portal. Furthermore, one or more of the plurality of mobile RFID portals reads the identifications of proximately located RFID tagged items a first time when a first predetermined mobile asset/vehicle operational data is identified and a second time when a second predetermined mobile asset/vehicle operational data is identified. The one or more of the plurality of mobile RFID portals may also transmit data representative of the RFID tagged items read the first time and the second time along with a location at which the second reading was made to the central data processing system. Finally, the central data processing system stores the data representative of the location at which the second reading was made as a current location for each of the RFID tagged items that were read both the first time and the second time.

These and other objects, features and advantages of the present invention will become more apparent upon reading the following specification in conjunction with the accompanying drawing figures.

DETAILED DESCRIPTION OF THE PREFERRED EMBODIMENTS

Figure 1:
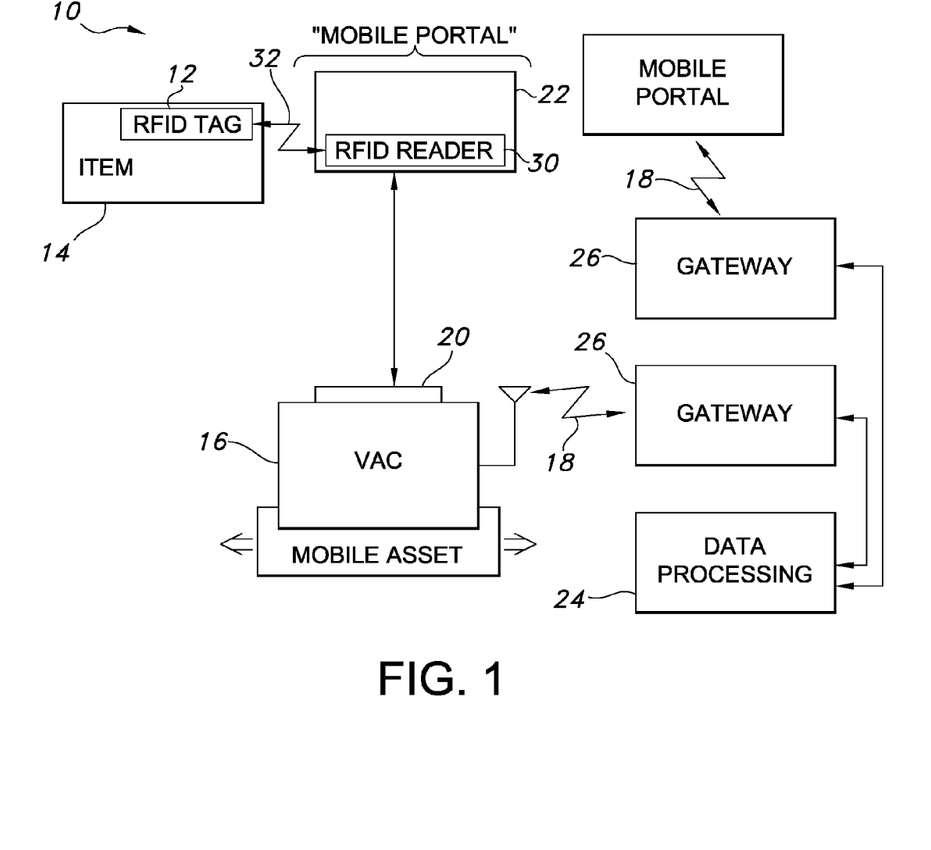
FIG. 1 is a block diagram of an asset/item monitoring system in accordance with a preferred embodiment of the invention.

Referring now in detail to the drawing figures, wherein like reference numerals represent like parts throughout the several views, FIG. 1 illustrates a block diagram of an asset/item monitoring system 10 in accordance with a preferred embodiment of the invention.

The system 10 includes at least one RFID tag 12. The RFID tag 12 can be a low cost device of known passive or active design (such as, for example, the tags supplied by Matrics/Symbol Technologies, Inc.) that can be attached to an item 14 to be tracked. The item 14 may range in size from a relatively small article (such as a product, package or box) to a relatively large article (such as a pallet, crate or container).

The system 10 further includes a vehicle asset communicator (VAC) 16, which is a device that is installed on preferably each mobile asset (i.e., a vehicle, such as, for example, a forklift, man-lift, truck, trailer, pallet rider, order picker, loader, handler, airport ground-support vehicle, and the like, which operates to manipulate tagged items). The vehicle asset communicator 16 is operable to effectuate data communication transmissions over a radio frequency (RF) data communications link 18.

The vehicle asset communicator 16 can further include a peripheral interface 20 through which interconnection for data communication can be made with one or more peripheral data sensing and data capture devices 22. The information collected by the peripheral devices 22 is then packaged by the vehicle asset communicator 16 for transmission over the data communications link 18.

At the other end of the data communications link 18, a central data processing system 24 receives and processes the information communicated from the vehicle asset communicator 16. The processing of the communicated information in the central data processing system 24 may include displaying the information, storing the information, searching the information, manipulating the information, and the like data processing operations known and understood to those skilled in the art. Accordingly, the central data processing system 24 may, in one embodiment, take the form of a server and database. As an example, the central data processing system may include Windows®-based software for the purpose of monitoring and tracking the movement of the items throughout an area or facility both historically and in real-time. The software could also be used to monitor the productivity of the industrial vehicle/asset operators and equipment, as well as for fleet maintenance scheduling and safety checking.

Central data processing communication over the data communications link 18 is supported by one or more gateway devices 26. One or more gateway device(s) 26 are mounted at strategic locations so as to facilitate communication of data between the vehicle asset communicator 16 and the central data processing system 24. Gateway devices 26 can possess RF communication capabilities to support wireless data communication over the data communication link 18.

The RF communication over the data communications link 18 is, in a preferred implementation, a very low power link, and a highly secure link (for example, certified for use at military installations).

In a preferred implementation, the vehicle asset communicator 16 is an industrial vehicle monitoring device installed on a mobile asset. As mentioned previously, the mobile asset functionally operates to manipulate RFID-tagged items 14 (for example, by moving, lifting, placing, and the like). The industrial vehicle monitoring device in a preferred implementation is a wireless, intelligent, asset-mounted computer that can be programmed with decision-making capabilities. Such a device for the vehicle asset communicator is available from I.D. Systems, Inc., of Hackensack, N.J. The asset-mounted computer is interfaced into the vehicle to receive supply voltage. Additional interfaces allow the computer to receive information concerning operation of the asset (for example, vehicle motion status, speed and lift or tow status, operational parameters, and the like). The interface functionality further allows the monitoring device to interface to numerous peripherals for collecting data about the asset and the environment in which the asset is operating.

As an example, the device 16 uses its interface 20 to connect with the peripheral device 22 in the form of an RFID interrogator/reader 30. The interrogator/reader 30 via a read link 32 functions to read proximately located RFID tags 12 attached to items 14. From the RFID tags 12, the interrogator/reader 30 captures captured item identification information relating to the item(s). This captured item identification information from the proximately located RFID tags 12 passes through the interface 20 to the vehicle asset communicator 16 where it is transmitted over the data communications link 18 (via gateway 26) to the central data processing system 24.

Thus, if the mobile asset were moving a certain pallet (i.e., an item 14), the interrogator/reader 30 would read the RFID tag 12 attached to that pallet to obtain its identification, and the vehicle asset communicator 16 would transmit that pallet identification to the central data processing system 24 over the data communications link 18. In this way, the system 10 can track item location in connection and association with a mobile asset/moving vehicle.

The system 10 accordingly permits the tracking of a number of pieces of information relating to the items and the assets. For example, the vehicle asset communicator 16 may include a locator functionality (for example, using GPS, triangulation or other known location systems) and communicate over the data communications link 18 to the central data processing system 24 the location of the vehicle at a certain time, or in connection with performing a certain activity (such, lifting, placing, loading, and the like). The communicated location information can further be associated with other collected information.

The vehicle asset communicator 16 may include a user/operator data input device (such as a keypad or touchscreen) through which that user/operator enters data of interest (for example, access codes, log-in codes, operation codes, maintenance information, and the like). The user/operator entered information is then communicated over the data communications link 18 to the central data processing system 24.

The vehicle asset communicator 16 can further utilize the RFID reader 30 to read from the RFID tag 12 the identification of the item being manipulated, and associate that identification with a timestamp indicating when the item was manipulated. If the communicator is location enabled, the location where the manipulation occurred is also collected. All this information may then be communicated over the data communications link 18 to the central data processing system 24 where it can be processed so as to allow for identification of the item, its route of travel, and the times when it was manipulated.

The vehicle asset communicator 16 can further utilize the collected location data in connection with a data communication report made to the central data processing system 24. The location data can be processed, in connection with the other reported time stamped data, so as to allow the system 10 to validate the moves made by the asset/vehicle in the sense of monitoring place and time of movement and confirming asset/vehicle authorization to be at that place at the noted time.

The system 10 uses the peripheral connection 20 support provided by the asset-mounted computer of the vehicle asset communicator 16 to interface with the wireless RFID interrogator 30. The system 10 accordingly can integrate the RFID reader into a wireless, intelligent, asset-mounted computer, such that intelligent, automated, accurate interrogations will occur for items being manipulated by the vehicle. This would enable the reading of RFID tags in any location within or outside a facility, without the need for a fixed portal infrastructure, by leveraging the processing capabilities of mobile, intelligent, wireless devices (i.e., the vehicle asset communicator). The communicator and reader accordingly may form a "mobile portal" that allows for RFID read data to be collected in connection with vehicle operation. The mobile portal may comprise additional elements such as, but not limited to, a controller for controlling operation of the mobile portal, a data storage device for storing data captured by the RFID Reader 30, and/or a Mobile Portal Processor. When the vehicle moves into communication range of the gateway device 26, a data communications link is established between the communicator and the central data processing system to enable communication of pertinent data.

A number of benefits accrue from use of the system 10 over conventional systems.

Lowest cost device on the item—RFID tags are becoming the standard. RFID tag readers on vehicles/assets use the lowest possible cost RFID tag system on the numerous items to be tracked. As RFID tags are proliferated, the system becomes significantly more comprehensive.

Secure RF system—the RF system on the asset that transmits the RFID tag data to the central database is proven secure (for example, is currently installed on military bases). The system has been through DITSCAP approval.

Data processing power on the vehicle/asset allows decisions to be made remotely without reliance on a central computer. The RF device on each vehicle/asset not only identifies the item being manipulated, but also provides instantaneous feedback to the operator in case there is a mistake (i.e., the operator is told he is manipulating the wrong item in comparison to, for example, a shipping list). Data from each manipulation is analyzed remotely at the asset without relying on the central computer. This lessons the load on the central computer and significantly reduces the response time it takes to convey the validity of each item manipulation to the operator.

Significantly fewer RFID tag readers are required than conventional systems. Typically, tagged items are identified when they pass through fixed portals. These fixed portals are limited in number and usually monitor the item twice (once on their way in and once on their way out). The location of a particular item is therefore impossible to determine unless portals are installed on nearly every inch of the facility. Using the system 10, the RFID readers are powered from the vehicle/asset, thus allowing the assets themselves to function as mobile portals. As a result, management can determine the precise location of an item whether it is stationary or on the move. By utilizing the vehicles/assets that move the items as mobile portals, the installation of much fewer portals throughout the facility is achievable while allowing for essentially an unlimited number of monitoring points.

Another significant benefit of the system is the elimination of the need for real-time network access for the RFID interrogator, especially in a situation where the interrogator must be mobile. This implementation creates a "nested" RFID tag system, in which the initial read would transpire at the vehicle, with the interrogated data stored on the mobile, asset-mounted computer, followed by a secondary data transfer between the mobile, asset-mounted computer and its wireless infrastructure. For example, by adding tag reading capability to the vehicle-mounted system of an airport baggage handler, the operator of a tug or belt loader can scan and/or verify bags (i.e., items) as they are loaded onto a plane, right at the plane, without requiring real-time network access for a mobile interrogator or requiring the driver to drive through a portal, both of which might hold up the airplane loading process. The manifest of bags on the plane would then be stored on the mobile, intelligent, wireless device. Additionally, because the mobile, intelligent computer can include vehicle access control authentication, the system can also record the person that loaded the plane and the location and time of the process. Because the mobile, intelligent computer can also store a passenger baggage manifest, it can also double check each bag for positive passenger baggage matching. Because the mobile, intelligent computer can provide for a display, it can notify the driver of the vehicle about any unexpected baggage scans, such as a bag that is not in the manifest. When the vehicle device comes back into range of its RF infrastructure, even if not available at the airplane loading point, all verifications and uploads would transpire and no data would be lost. In general, this implementation would greatly simplify installation requirements and eliminate a major source of system failure/delay during airplane loading.

Yet another significant benefit of the present system is the automation of the scanning process. In a conventional system, the scanning process is either constantly performed, such as at a fixed portal, or is initiated via a manual process, such as pressing a scan button. In a mobile vehicle environment, such as at a warehouse distribution center, the items (such as pallets) are often in range of a vehicle that is not actually moving the pallet. As a result, the likelihood for false reads is significant with a "constant" read approach at the vehicle. The manual scan process is also flawed in that it requires a vehicle operator to remember to press the scan button to perform a scan, and the scan will only occur once. The fixed portal approach is also unreasonable, in that it requires the driver to drive potentially long distances to the nearest portal to perform a read. In this implementation, the mobile, asset-mounted computer is aware of the vehicle's lift/tug status and/or motion status (i.e., is it manipulating tagged items). Throughout the present description, the vehicle's lift/tug status and/or motion status may be referred to as the vehicle's operational status. However, a vehicle's operational status may include additional states beyond the lift/tug status and motion status.

Using these inputs to initiate RFID tag scans in an intelligent way provides for an accurate, automated solution for pallet scanning, for example. The initial read would transpire at the vehicle, at the time the load is first lifted or tugged, with the interrogated data stored at the vehicle. Then, while the vehicle is in motion, the system can optionally scan periodically to further validate the resultant list of scanned items against the initial list, to improve scanning accuracy.

For example, if on the initial scan, an item is scanned which is not actually on the forklift, it will not appear again on a subsequent scan after the vehicle has traveled a certain distance. The list of items would continue to be "honed" until the vehicle either comes to a stop or drops the load. At that point, the intelligent, mobile, asset-mounted computer will perform a secondary data transfer of the accurate list of loaded items to its wireless infrastructure. This solution can, for example, add accurate tag reading capability to each factory vehicle in a distribution warehouse, without the operator of the forklift or pallet rider actively initiating any scans or driving through a portal, and without requiring real-time network access for the mobile interrogator which could be nearly impossible in such an uncontrolled environment. The list of moved pallets would then be stored on the mobile, intelligent, wireless device. Additionally, because the mobile, intelligent computer can include vehicle access control authentication, the system can also record the person that moved the items and the location and time of the process. Because the mobile, intelligent computer can also include a lift weight sensor, it can also transmit and/or double check each pallet's weight. When the vehicle device comes back into range of its RF infrastructure, even if not available at every pickup point within the warehouse, all uploads would transpire and no data would be lost. In general, this implementation would greatly simplify installation requirements, eliminating the need for each vehicle operator to drive through a fixed portal to perform a scan, which would improve factory efficiency. Since the mobile asset can determine its location at all times, the start and end locations can also be transmitted with the final "honed" list of tags, rather than sending the scan location for each intermediate scan attempt.

It will, of course, be understood that the foregoing example relating to validating scan content in the context of airport baggage handling has much broader application to any item manipulation process including the pallet handling examples.

The vehicle asset communicator 16 may further support bi-directional communications over the data communications link 18. Such communications may, for example, be effectuated using 2-way paging. With bi-directional communication support, item manipulation jobs can be downloaded to the vehicle/asset operator. This would initiate the need to perform an RFID scan. The job contents/specification can further be used to validate the RFID scan and thus the manipulation of the items identified by that scan. Given reported vehicle/asset location information, the downloaded job can be efficiently sent to an available operator (vehicle) which is closest to the currently believed location of the items which are the subject of the job.

In the context of an RFID tagged container (or other item containing device), it will be understood that the RFID tag may include the identifications for items contained in the container and that the item identifications will be communicated to the central data processing system 24 following a read of the container RFID tag.

Figure 2:
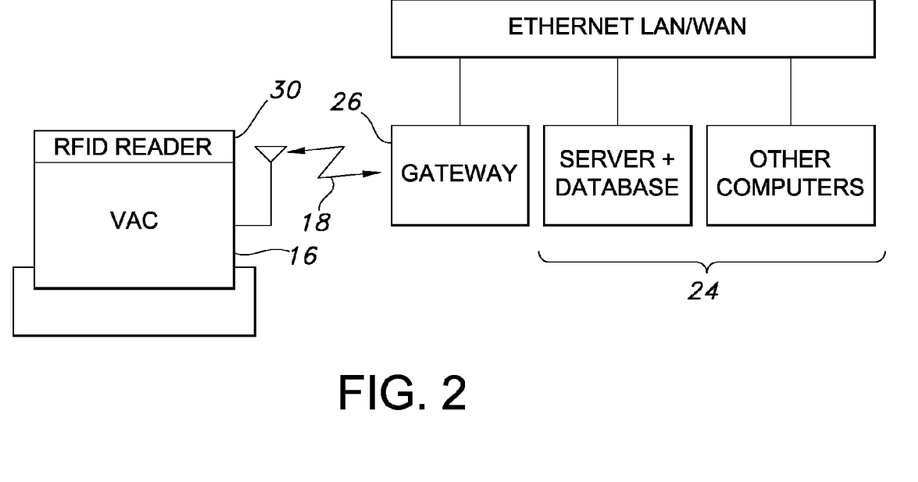
FIG. 2 illustrates an implementation configuration for the system of FIG. 1.

Reference is now made to FIG. 2 wherein there is shown an implementation configuration for the system 10. Each vehicle asset communicator 16 supports multiple sensors with respect to the vehicle/asset to which it is mounted. The vehicle asset communicator 16 functions as an autonomous embedded device. With respect to data communications, the vehicle asset communicator 16 is not provided with an IP address.

The data communications link 18 supports communications between the vehicle asset communicator 16 and the gateways 26. This link 18 is preferably a bi-directional RF communications link in the 868-928 MHz RF band. Operationally, the vehicle asset communicator 16 and gateway 26 support frequency agile access to the link 18, and communications are maintained at low power so as to not interfere with other RF systems.

The gateways 26 are preferably strategically located with respect to the environment within which the system 10 operates. For example, the gateways can be positioned at critical access points such as entrances and exits. Multiple gateways 26 are provided so that no single point of failure exists with respect to the data communication path between the vehicle asset communicator 16 and the data processing system 24.

The connection between the gateway 26 and the data processing system 24 is preferably an Ethernet LAN/WAN. UDP/IP protocols can be used for the data communications. The data processing system 24 may be configured as a Microsoft® SQL Server having access to a Microsoft® SQL Server database. Windows®-based services are provided on the server which can be a part of a larger existing computer network if desired (or alternatively operated on a stand-alone basis). Other computers on the network run Windows®-based or Web-based support software. Communication between other computers and server associated with the system 10 is supported by the Ethernet LAN/WAN and utilize ODBC or SQLOLEDB over TCP/IP.

Figure 3:
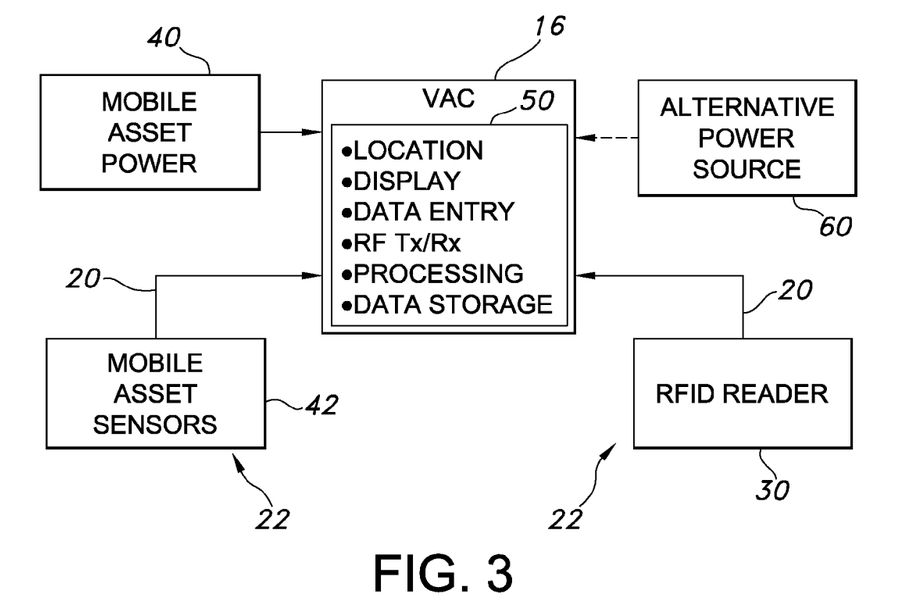
FIG. 3 illustrates an operational implementation diagram for a vehicle asset communicator in accordance with a preferred embodiment of the invention.

Reference is now made to FIG. 3 wherein there is shown an operational implementation diagram for a vehicle asset communicator 16. The vehicle asset communicator 16 is associated with a mobile asset or vehicle (for example, mounted therein) and receives power 40 from the asset itself (wherein the asset is identified for exemplary purposes herein as a forklift). Through its peripheral interface 20, the vehicle asset communicator 16 is coupled to a plurality of vehicle sensors 42 that function to detect certain operational conditions of the vehicle. For example, the sensors 42 may function to detect whether the forklift vehicle's lift mechanism is moving (and the direction, such as up/down, of that movement). As another example, the sensors 42 may function to detect whether a load is present on the lift mechanism (and the weight of that load). Still further, as an example, the sensors 42 may function to detect whether or not the forklift vehicle is moving (and provide information concerning speed of the vehicle). Each of the sensors 42 may provide data regarding the operation of the vehicle. Such vehicle operational data may include, but is not limited to vehicle motion, lift operation, lift direction, load presence, load weight, vehicle speed, vehicle direction, vehicle location, vehicle type, and vehicle operator. The vehicle operational data may also be referred to as the vehicle operational status or the vehicle operational characteristics.

Data collected by these sensors 42 is provided to the vehicle asset communicator 16 for processing in the manner described herein. The vehicle asset communicator 16 can also be coupled to the vehicle's starter or interlock system, which functions to interrupt and control vehicle use. This permits the vehicle asset communicator 16 to verify and validate the operator of the vehicle before permitting its use.

Through its peripheral interface 20, the vehicle asset communicator 16 is further coupled to RFID reader/interrogator 30. As discussed herein, the interrogator 30 reads the identification information from proximately located RFID tags. The communicator 16 may control actuation of the interrogator 30. In one implementation, the interrogator can be turned on whenever the communicator 16 is on. Thus, RFID reads will occur substantially continuously. In another implementation, the interrogator can be selectively turned on at the instruction of the communicator 16. Thus, RFID reads only occur when desired (for example, as an event driven exercise). Beneficially, this implementation minimizes spurious read and RF interference due to reads and can be used to substantially improve read accuracy, since multiple reads can be combined with sensor data to "hone" a tag list.

The vehicle asset communicator 16 supports a number of processor driven functionalities 50 (executed in response to and under the control of an algorithm executed by a processor within the vehicle asset communicator). One primary function performed is data storage (for example, through use of a RAM). Data collected from peripheral devices 22 (vehicle sensors, RFID reader 30, and the like) can be temporarily stored in the data storage memory in the event the communicator 16 does not, or cannot, communicate that data over the link 18.

The vehicle asset communicator 16 is also an autonomous, intelligent device and accordingly includes processing functionality that governs its actions. This processing functionality can determine when to take sensor and/or RFID reads and when to make data communications. For example, a read or communication may be triggered by identifying the occurrence of an event of interest (such as vehicle movement or item manipulation or location detection). The vehicle asset communicator 16 still further includes a radio frequency (RF) communications functionality. In one implementation, that functionality can be only a transmit operation. In another implementation, the functionality is a transceiver which supports both transmit and receive operations. Preferably, the RF communications are low power and secured—as an example, communications frequency agile in the 868-928 MHz RF band.

The vehicle asset communicator 16 still further incorporates, or supports the connection to, a visual display and a data entry device. As an example, both display and entry can be accommodated using a touchscreen. Separate LED/LCD display and data entry keypads provide another optional implementation. Data entered through the data entry device is handled by the processing functionality and stored in the data storage memory. Additionally, as discussed herein the vehicle asset communicator 16 includes, or supports connection to, a geographic location system such as a GPS receiver or a triangulation system. Location data is collected at the direction of the processing functionality and stored in the data storage memory.

The vehicle asset communicator 16 configured in the manner described herein allows for the collection of important data in a related manner. For example, through the vehicle sensors the vehicle asset communicator 16 can determine that an item manipulation is occurring (for example, a pallet is now on the lift). Responsive thereto, the processing functionality can order the RFID reader 30 interrogate the RFID tag for the item and collect the associated identification data. This data can be stored in the data storage memory and transmitted, when appropriate, using the RF communications functionality over the link 18.

Location data may also be collected and associated with the identification data to provide a record of where the item was manipulated and interrogated. Monitoring of location can continue as the mobile asset moves about the environment. Collected location data can be stored to enable tracking of mobile asset movement in connection with the handling and manipulation of the item.

Through the data entry device, the identification of the mobile asset operator can be obtained with this information also stored in the data storage memory in association with the item being handled. In this way, a record is kept of who was involved in data handling and operation of the mobile asset. All of the foregoing data can be time stamped so as to record when the data was collected. Again, this time information is stored by the data storage memory in association with the other data. Thus a record is kept of when each read or data collection event occurred.

An appropriate processing algorithm can be created within the capabilities of one skilled in the art to govern the operations of the vehicle asset communicator processor. Some functional operations to be performed by the processor are discussed in detail herein.

Figure 4:
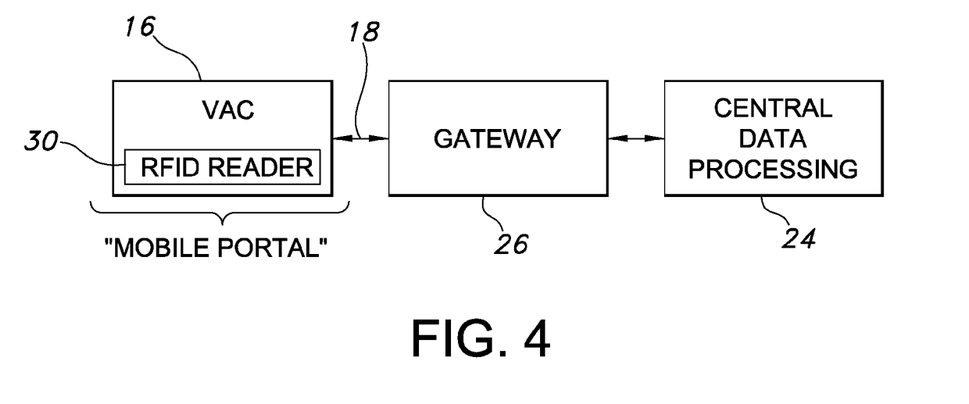
FIG. 4 is a functional block diagram illustrating the operation of the system of FIG. 1.

Reference is now made to FIG. 4 wherein there is shown a functional block diagram describing operation of the system of FIG. 1. The vehicle asset communicator 16 includes an RFID reader/interrogator 30 and further monitors the mobile asset operation. Certain operational actions taken by the mobile asset trigger actuation of the RFID reader/interrogator 30 to obtain item identification from proximately located RFID tags 12. The processing functionality processes the identification data obtained by the RFID reader 30 in comparison with stored data obtained from the central data processing system 24 which specifies the items to be manipulated by that mobile asset. The processing functionality can accordingly ensure accuracy in the item manipulation process. For example, the central data processing system 24 may specify that certain items are to be moved from one location to another. When the mobile asset reaches the first location and captures the items, an RFID read is performed to obtain the identification of the items being captured. This list of item identifications is then compared by the processing functionality in the vehicle asset communicator 16 to ensure that the proper items have been captured. If a discrepancy is found (i.e., too many items, wrong items, not enough items, missing items, and the like), the operator of the mobile asset is notified through the display so that corrective action can immediately be taken. A discrepancy report can also be formatted by the vehicle asset communicator 16 for transmission back to the central data processing system 24.

As mentioned before, the RFID read can be triggered by a certain event. For example, the mobile asset may move about the environment and if the RFID reader were active then many irrelevant identification reads would occur. With event triggering, the number of reads can be controlled, thus making the collected data more relevant and accurate. In one example, as a forklift moves about a warehouse without a load of items, no RFID reads are taken. This not only eliminates spurious reads from the forklift's reader, but also prevents interference with adjacent forklifts. When the forklift stops and drops its lift to access an item, this event acts as a trigger and the RFID reader is activated to check for proximately locate RFID tags. The read identifications are then captured and stored by the vehicle asset communicator. The forklift then drives off with its collected items. This triggers a second RFID read for proximately located RFID tags. The currently read identifications are captured and compared with the previously read and stored identifications. This comparison functions to confirm that the items identified in the first read are still present on the forklift. If an item is missing as identified by the comparison an alert can be generated. Also, if an item is missing, this could be indicative of the fact that the read item was proximately located to the forklift when the lift dropped, but was not one of the items which was captured and moved; alternatively, the missing item may indicate a read failure during this scan. Still further, if a new item is found then this would be indicative of a spurious read (of a proximate but not loaded item) as it is not possible to have captured a new tagged item while the forklift is in motion, or of a failure rate from a previous attempt. This new item read can then be ignored. This process can be repeated periodically throughout the duration of the movement to further validate the list of loaded items, and resolve discrepancies between RFID read rate issues with non-loaded items. It will thus be understood that validation of the loaded items can be more accurately made than could otherwise be done with a single scan.

The gateway 26 functions to receive data transmitted from the vehicle asset communicator 16 over the link 18. The gateway 26 further functions, in implementations where the vehicle asset communicator 16 possesses transceiver RF functionality, to send data received from the central data processing system 24 to the vehicle asset communicator. As mentioned herein, this transmitted data may comprise a specification of items to be manipulated by the mobile asset. The gateway 26 supports communication with a plurality of vehicle asset communicators 16 and thus functions as a node in a distributed processing system.

The central data processing system 24 supports discontinuous communications connections with the plurality of vehicle asset communicators 16. No real-time communications link need be established with the vehicle asset communicators 16. For example, with respect to the vehicle asset communicator 16, it can store data to be transmitted to the central data processing system 24 and wait for an appropriate time when access to the gateway 26 over the link 18 becomes available. Similarly, with respect to the central data processing system 24, it can communicate a message intended for delivery to a certain vehicle asset communicator 16 to one or more of the gateways 26 where the message is queued for later delivery by that gateway when the addressed vehicle asset communicator comes into communications range.

Importantly, the central data processing system 24 need not make any decisions about the validity of RFID reads or the data it receives from vehicle asset communicators 16. Instead, the vehicle asset communicators 16 operate as autonomous devices with processing functionality that allows each communicator to evaluate the validity of its RFID reads and thus communicate validity checked data over the link 18 to the central data processing system 24. Additionally, the central data processing system 24 need not micro-manage the operations of the vehicle asset communicators, as the autonomous operation and intelligent processing functionality of the vehicle asset communicators allows the communicators to function with minimal, and in some instance no, instruction. In this way, it will be recognized that only necessary data is transmitted and received by the central data processing system 24. The abilities of the vehicle asset communicator 16 and gateway 26 to engage in decision making advantageously eliminate the need for middleware, real-time communications links, and unnecessary communication. Instead, problems can be detected and addressed with the vehicle asset communicator 16 thus obviating the need for the large data processing capabilities at the central node.

It will of course be understood that the vehicle asset communicator and its associated RFID reader 30 could be installed on a moveable item/asset itself (such as a freight container, a trailer, a railroad freight car, and the like). Since these items/assets may not be powered for movement, the vehicle asset communicator 16 must receive power from an alternate power source 60 (see FIG. 3) such as a rechargeable battery. When in this configuration, the "mobile portal" can read the identifications of tagged items as they are placed in or removed from the moveable asset/item. Then, when the moveable asset/item is moved into range of a gateway 26, for example, when a trailer drives off a lot or a container is loaded on a ship, the read identification information for the current item contents can be communicated through the gateway 26 to the central data processing system 24.

A more complete understanding of the configuration and operation of the system of the present invention may be obtained by consideration of the following operational characteristics.

First, it is recognized that the mobile portal can read and store RFID information in an autonomous manner (i.e., without the use of the wireless gateway or the central processing computer). In this way, reads can occur regardless of whether a wireless connection with the central computer exists. Additionally, one can be assured of the performance of a read, regardless of wireless connection state, since the mobile portal can make the read and store the data until an opportunity arises to wirelessly communicate with the central computer. The system is accordingly much more robust and immune to interfering wireless systems.

Second, since the RFID reads can be triggered by events such as vehicle movement and/or lift operation alone, and further does not require the existence of a wireless communication link to the central computer, there is no need in a given environment for fixed portals. As discussed herein, such portals are extremely wasteful for drivers to pass through in the course of business (wastes of time and money).

Third, because the mobile portals are intelligent computing devices, the mobile portal can take actions on its own (in accordance with its programming) without commands from a central processing system. For example, the mobile portal can decide on its own to shut down in the event of an invalid read or alternatively generate and alert or warning to an operator. Still further, the mobile portal can monitor for state of completion concerning a designated task and provide status updates to the operator concerning completion of that task. Additionally, the mobile portals can "think" in a deductive reasoning capacity with respect to the collected data and then draw necessary conclusions with respect to item manipulation.

Fourth, the intelligent computing device design for the mobile portals further facilitates control over use of the mobile asset. Again acting in an autonomous or semi-autonomous manner, the mobile portal can exercise control over use of the mobile asset by requiring an operator to present identification prior to enabling the asset for operation. In this way, once knowledge of the authorized operator is presented, the mobile portal can associate that operator identification to each RFID read in an automatic manner. This information can be saved and remotely reported, and thus allows for tracking of which operator manipulated each item.

Fifth, through use of the locating component, the mobile portal can implement its own continuous vehicle location determination technique (indoors and outdoors) in an automatic fashion. This allows the mobile portal to associate each RFID read to a location. The location information can be coupled by the mobile portal with other data, such as vehicle sensor data, to associate operation locations to RFID tagged items and the movement or manipulation of those items.

Sixth, the collected sensor data can be associated with RFID reads. For example, an amount of weight lifted, a distance traveled, a length of time controlled, and the like, can all comprise pieces of information that are associated with a read. This data becomes even more valuable when further linked to location data as discussed herein.

Seventh, the mobile portal can implement an auto-read algorithm wherein it exercises control over when, where and how often RFID reads are taken. The algorithm further can intelligently draw conclusions from the reads and the instances of those reads concerning what, where, when and how items are being manipulated. For example, the mobile portal can leverage knowledge of lift status and vehicle movement status (including distance traveled) to intelligently cause multiple RFID reads to occur and the filter out read information which do not "stay" with the vehicle during lift and/or movement so as to provide significantly improved read accuracy. Thus, RFID reads are not saved with respect to nearby located items since that data will not be present over the course of the multiple RFID reads displaced over time and/or distance. In this way, the mobile portal can accurately report only as to those items which actually have been manipulated.

Eighth, since the algorithm is automatically executed (i.e., without need for human interaction and control), and further is initiated by the mobile portal itself (i.e., without need for central computer interaction and control), human error and environmental communications conditions are eliminated as factors which could adversely affect the read process.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method of detecting RFID tagged items being moved by a mobile asset/vehicle, the method comprising:
   actuating an RFID reader coupled to the mobile asset/vehicle to read identifications of proximately located RFID tagged items a first time at a first location after loading of the mobile asset/vehicle and storing a first set of read RFID tagged items, the first set of read RFID tagged items including RFID tagged items loaded onto the mobile asset/vehicle and RFID tagged items not loaded on the mobile asset/vehicle;
   actuating the RFID reader to read identifications of proximately located RFID tagged items a second time at a second location before the next unloading of the mobile asset/vehicle and storing a second set of read RFID tagged items, the second set of read RFID tagged items including RFID tagged items loaded onto the mobile asset/vehicle and RFID tagged items not loaded on the mobile asset/vehicle, the second location being different from the first location and a reading range of the RFID reader at the second location not overlapping with a reading range of the reader at the first location;
   comparing the first set of read RFID tagged items to the second set of RFID tagged items to identify RFID tagged items listed in both the first set and the second set; and
   identifying the RFID tagged items listed in both the first set and the second set as the only items being transported by the mobile asset/vehicle.

2. The method of claim 1, wherein the step of actuating an RFID reader to read identifications of proximately located RFID tagged items is triggered based on operational data of the mobile asset/vehicle.

3. The method of claim 2, wherein the operational data is representative of vehicle motion data.

4. The method of claim 2, wherein the operational data is representative of a vehicle lift condition.

5. The method of claim 2, wherein the operational data is representative of a vehicle location.

6. The method of claim 1, wherein the step of actuating an RFID reader to read identifications of proximately located RFID tagged items it triggered when the mobile asset/vehicle transitions from a stationary state to a moving state.

7. The method of claim 1, wherein the step of actuating an RFID reader to read identifications of proximately located RFID tagged items it triggered when a sensor associated with the mobile asset/vehicle senses that a load is present on the mobile asset/vehicle.

8. The method of claim 1, further comprising:
   actuating the RFID reader one or more additional times to read identifications of proximately located RFID tagged items and storing one or more additional sets of readings of RFID tagged items;
   wherein comparing the first set of read RFID tagged items to the second set of RFID tagged items to identify RFID tagged items listed in both the first set and the second set further comprises comparing the first set, the second set, and the one or more additional sets of read RFID tagged items to identify RFID tagged items listed in each of the sets; and wherein identifying the RFID tagged items listed in both the first set and the second further comprises identifying the RFID tagged items listed in each of the sets as being transported by the mobile asset/vehicle.

9. The method of claim 1, further comprising:

actuating the RFID reader one or more additional times to read identifications of proximately located RFID tagged items and storing one or more additional sets of readings of RFID tagged items;

comparing items listed in both the first set and the second set with items listed in the one or more additional sets to identify RFID tagged items listed in each of the sets;

identifying the RFID tagged items listed in each of the sets as being transported by the mobile asset/vehicle.

10. A system for tracking RFID tagged items, the system comprising:

a plurality of mobile RFID portals for attachment to a plurality of mobile asset/vehicles, each mobile RFID portal including an RFID reader for reading identifications of proximately located RFID tagged items, a data storage device for storing read identifications, and a communicator for transmitting read identifications over a wireless interface;

a central data processing system coupled to the wireless interface to receive the read identifications communicated from the communicators in the plurality of mobile RFID portals;

wherein the central data processing system maintains records of the location of a plurality of RFID tagged items present in a predetermined geographic area; and wherein the central data processing system receives data from each of the plurality of mobile RFID portals representative of the RFID tagged items moved by the mobile asset/vehicle associated with the respective mobile RFID portal;

wherein one or more of the plurality of mobile RFID portals reads the identifications of proximately located RFID tagged items loaded and not loaded on the mobile asset/vehicle a first time at a first location after loading of the mobile asset/vehicle when a first predetermined mobile asset/vehicle operational data is identified;

wherein the one or more of the plurality of mobile RFID portals reads the identifications of proximately located RFID tagged items loaded and not loaded on the mobile asset/vehicle a second time at a second location before the next unloading of the mobile asset/vehicle when a second predetermined mobile asset/vehicle operational data is identified, the second location being spaced apart from first location such that a first reading range of the mobile RFID portal at the first location does not overlap a second reading range of the mobile RFID portal at the second location; and wherein RFID tagged items being transported by the mobile asset/vehicle are identified by comparing the RFID tagged items that were read both the first time and the second time.

11. The system of claim 10, wherein the predetermined mobile asset/vehicle operational data identified represents vehicle motion data.

12. The system of claim 10, wherein the predetermined mobile asset/vehicle operational data identified represents a vehicle lift condition.

13. The system of claim 10, wherein the one or more of the plurality of mobile RFID portals reads the identifications of proximately located RFID tagged items a second time a predetermined time interval after the first time.

14. The system of claim 10, wherein the one or more of the plurality of mobile RFID portals reads the identifications of proximately located RFID tagged items a second time when a load is released.

15. The system of claim 14, wherein the mobile portal determines that a load is released based on vehicle operational data.

16. The system of claim 14, wherein the communicator of the one or more of the plurality of mobile RFID portals transmits location data when the load is released.

17. The system of claim 14, wherein the mobile portal stores location data when the load is released.

18. The system of claim 14, wherein the central data processing system stores data representative of the RFID tagged items that were read at both the first time and the second time and the location data.

19. The system of claim 14, wherein the central data processing system stores the location data as representative of a current location of the RFID tagged items that were read both the first time and the second time.

20. The system of claim 10, wherein the one or more of the plurality of mobile RFID portals reads the identifications of proximately located RFID tagged items one or more additional times, and the RFID tagged items that were read both the first time and the second time are compared to RFID tagged items read one or more additional times to verify that the RFID tagged items transported by the mobile asset/vehicle have been correctly identified.

* * * * *